US009090152B2

United States Patent
Yoshimoto

(10) Patent No.: US 9,090,152 B2
(45) Date of Patent: Jul. 28, 2015

(54) VEHICLE DOOR BELTLINE MOLDING

(71) Applicant: Katayama Kogyo Co., Ltd., Ibara-Shi (JP)

(72) Inventor: Naoki Yoshimoto, Asakuchi (JP)

(73) Assignee: Katayama Kogyo Co., Ltd., Ibara-Shi (JP)

( * ) Notice: Subject to any disclaimer, the term of this patent is extended or adjusted under 35 U.S.C. 154(b) by 0 days.

(21) Appl. No.: 14/157,818

(22) Filed: Jan. 17, 2014

(65) Prior Publication Data

US 2014/0203583 A1   Jul. 24, 2014

(30) Foreign Application Priority Data

Jan. 21, 2013 (JP) ................................. 2013-008466

(51) Int. Cl.
*B60J 1/16* (2006.01)
*B60J 10/04* (2006.01)

(52) U.S. Cl.
CPC ..................................... *B60J 10/041* (2013.01)

(58) Field of Classification Search
CPC .... B60J 10/0065; B60J 10/0068; B60J 10/04; B60J 10/041
USPC ....................... 49/377, 475.1, 490.1, 372, 374
See application file for complete search history.

(56) References Cited

U.S. PATENT DOCUMENTS

| | | | | |
|---|---|---|---|---|
| 5,671,565 A | * | 9/1997 | Furuse | 49/377 |
| 6,446,392 B1 | * | 9/2002 | Maki | 49/377 |
| 8,001,727 B2 | * | 8/2011 | Ho et al. | 49/377 |
| 8,104,227 B2 | * | 1/2012 | Tamura | 49/377 |
| 2006/0254149 A1 | * | 11/2006 | Kanbara et al. | 49/377 |

FOREIGN PATENT DOCUMENTS

JP      2007-131016 A1     5/2007

* cited by examiner

*Primary Examiner* — Katherine Mitchell
*Assistant Examiner* — Catherine A Kelly
(74) *Attorney, Agent, or Firm* — Burr & Brown, PLLC

(57) ABSTRACT

A beltline molding for a vehicle door includes a molding main body that extends from a window raising and lowering area to a surface of a door frame, and a step cross-section section including a seal lip that comes in sliding contact with a window, a vertical flange that extends downward from the upper part of the molding main body, and a clinch flange that extends downward from the vertical flange through a step that extends inward, the beltline molding being fitted to an upper edge of an outer panel of the vehicle door in the window raising and lowering area in a state in which the upper edge is held between the molding main body and the clinch flange, and the seal lip and the clinch flange having been removed in an area situated on the surface of the door frame while allowing the vertical flange to remain.

2 Claims, 5 Drawing Sheets

VEHICLE DOOR BELTLINE MOLDING

CROSS-REFERENCE TO RELATED APPLICATION

Japanese Patent Application No. 2013-008466 filed on Jan. 21, 2013, is hereby incorporated by reference in its entirety.

BACKGROUND OF THE INVENTION

The present invention relates to a beltline molding that is fitted to a window raising and lowering area of a vehicle door.

A vehicle door is normally designed so that a door frame is vertically arranged on the upper part of a door panel to form a window area, and a window (door glass) disposed inside the door panel is moved upward and downward in the window area.

The door panel consists of an outer panel that forms the outer side of the door, and an inner panel that forms the inner side of the door, and the window is disposed between the outer panel and the inner panel.

A beltline molding is fitted to the upper edge of the outer panel. The beltline molding includes a seal lip that comes in sliding contact with the outer surface of the window and removes rain water.

The beltline molding also serves as a design molding that decorates the beltline of the outer side of the vehicle, and a design molding may be employed that is continuously disposed from the surface of the door frame to the window raising and lowering area (i.e., the upper edge of the outer panel).

When using such a beltline molding, it is necessary to remove the seal lip in the area situated on the surface of the door frame.

For example, JP-A-2007-131016 discloses an example in which the seal lip is removed from the end of the belt molding main body, and an end member is integrally injection-molded with the end of the belt molding main body.

Specifically, since rigidity is insufficient, or a separate end cap cannot be attached when the seal lip is removed from the end of the beltline molding to allow the design part to remain, the end member is integrally injection-molded with the end of the belt molding main body. However, it is necessary to use special equipment in order to implement integration by injection molding, and the exterior design is impaired since a lap allowance is required between the end member and the molding main body that are formed by injection molding.

SUMMARY OF THE INVENTION

The present invention provides a beltline molding that exhibits excellent end rigidity, ensures excellent external design continuity, and exhibits a high seal capability.

According to one aspect of the present invention, a beltline molding that is fitted to a vehicle door is provided, the beltline molding comprising:

a molding main body that extends from a window raising and lowering area to a surface of a door frame; and a step cross-section section that extends inwardly downward from an upper part of the molding main body, the step cross-section section including a seal lip that comes in sliding contact with a window, a vertical flange that extends downward from the upper part of the molding main body, and a clinch flange that extends downward from a lower part of the vertical flange through a step that extends inward, wherein the beltline molding is fitted to an upper edge of an outer panel of the vehicle door in the window raising and lowering area in a state in which the upper edge is held between the molding main body and the clinch flange, and wherein the seal lip and the clinch flange are removed in an area situated on the surface of the door frame, while allowing the vertical flange to remain.

The term "vehicle door" used herein refers to various doors such as the front door and the rear door of a passenger car, and a truck cabin door.

The term "door frame" used herein includes a door frame integrated with a pillar, and the surface of the door frame may include the surface of the pillar.

The present invention has features that the molding main body that forms the exterior design part of the door and the vertical flange that forms the step cross-section section ensure cross-sectional rigidity sufficient for attachment of an end cap to the end of the beltline molding even when the seal lip and the clinch flange have been removed.

It is preferable that the vertical flange is formed of a hard resin or the like.

An insert material may be embedded in the vertical flange as long as the clinch flange can be removed.

Since the beltline molding according to another aspect of the present invention includes the step cross-section section that extends inwardly downward from the upper part of the molding main body that forms a design surface, it is possible to implement a beltline molding including a molding main body that forms a design surface, and a step cross-section section that extends inwardly downward from an upper part of the molding main body, wherein the step cross-section section includes a vertical flange that extends downward from the upper part of the molding main body, and a clinch flange that extends downward from the lower part of the vertical flange through a step that extends inward, wherein the beltline molding is fitted to an upper edge of an outer panel of a vehicle door in a state in which the upper edge is held between the molding main body and the clinch flange, and the step cross-section section includes a seal lip that extends upward from the clinch flange so as to come in sliding contact with a window, and a sub-lip that extends upward from the vertical flange and comes in contact with an outer side of the seal lip.

Since the step cross-section section including the vertical flange is provided on the back side of the molding main body, it is possible to easily employ a double lip structure in which the seal lip is provided from the lower part of the step cross-section section, the sub-lip is provided from the upper part of the step cross-section section, and the end of the sub-lip comes in contact with an outer side of the seal lip.

When employing the double lip structure that includes the seal lip and the sub-lip, the sub-lip supports the side surface of the seal lip so that a variation in the window in the interior-exterior direction is absorbed, and the end of the seal lip always comes in contact with the surface of the window.

When the vertical flange extends almost vertically downward from the upper part of the molding main body, and the seal lip is provided from the lower part of the vertical flange or the clinch flange, a recess space may be formed around the bottom of the seal lip.

In this case, when the sub-lip is provided from the upper part of the vertical flange or the molding main body, the sub-lip serves as a design lip, and prevents accumulation of dust or the like in the space.

Since a closed space is formed between the seal lip and the sub-lip, a sound insulating effect can be obtained.

Since the beltline molding according to one aspect of the present invention includes the vertical flange that extends downward from the upper part of the molding main body, and is configured so that the seal lip and the clinch flange can be removed in the area situated on the surface of the door frame while allowing the vertical flange to remain, sufficient cross-sectional rigidity can be achieved while allowing the molding main body and the vertical flange to form a cross-section approximately in the shape of the letter "C." Therefore, an end cap can be attached to the end of the beltline molding.

Since the step cross-section section includes the vertical flange and the clinch flange that extends from the lower part of the vertical flange, it is possible to implement a double lip structure that includes the seal lip and the sub-lip that presses the outer side surface of the seal lip. The double lip structure prevents accumulation of dust or the like in the step space, and improves the window seal capability.

BRIEF DESCRIPTION OF THE DRAWINGS

FIGS. 1A and 1B are cross-sectional views illustrating a beltline molding according to a first embodiment of the present invention, wherein FIG. 1A illustrates the cross-section of the beltline molding in a window raising and lowering area that is cut at the cut line A-A in FIG. 5, and FIG. 1B illustrates the cross-section of the beltline molding situated on a door frame that is cut at the cut line B-B in FIG. 5.

FIGS. 2A and 2B are cross-sectional views illustrating a beltline molding according to a second embodiment of the present invention, wherein FIG. 2A illustrates the cross-section of the beltline molding in a window raising and lowering area that is cut at the cut line A-A in FIG. 5, and FIG. 2B illustrates the cross-section of the beltline molding situated on a door frame that is cut at the cut line B-B in FIG. 5.

FIGS. 3A and 3B are cross-sectional views illustrating a beltline molding according to a third embodiment of the present invention, wherein FIG. 3A illustrates the cross-section of the beltline molding in a window raising and lowering area that is cut at the cut line A-A in FIG. 5, and FIG. 3B illustrates the cross-section of the beltline molding situated on a door frame that is cut at the cut line B-B in FIG. 5.

DETAILED DESCRIPTION OF THE INVENTION

Examples of the structure of a beltline molding according to exemplary embodiments of the present invention are described below with reference to the drawings.

Figure 5:
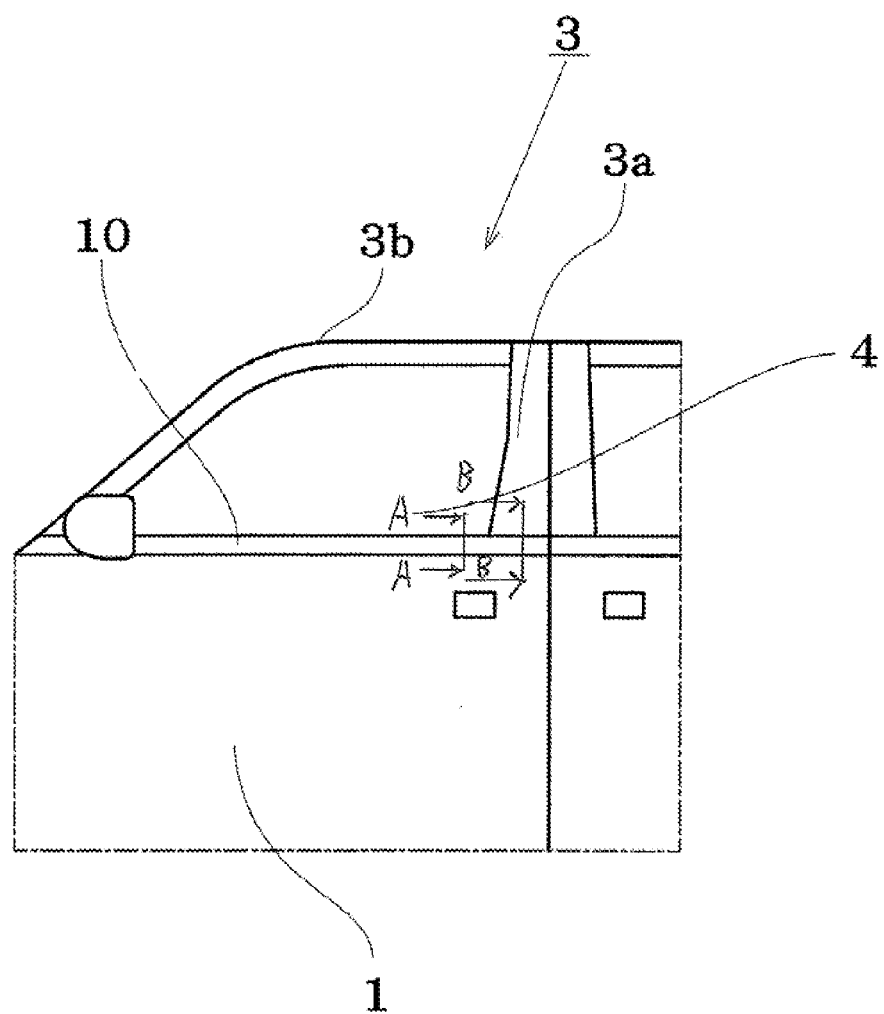
FIG. 5 illustrates a beltline molding fitting position.

FIG. 5 illustrates an example in which a beltline molding 10 is fitted to a vehicle door.

A window area is formed inside a door frame 3 that is provided on the upper part of a door panel (outer panel) 1.

A window (door glass) 4 is moved upward and downward in the window area.

The door frame 3 (front door frame) includes an arched frame 3b that is arched from the front side of the vehicle toward the roof, and a pillar 3a that guides the upward and downward movement of the window.

FIG. 5 illustrates an example in which the beltline molding 10 is continuously provided from the front-side surface of the arched frame 3b to the surface of the pillar 3a through the window raising and lowering area.

Note that the beltline molding 10 may be continuously provided to only the front-side of the arched frame 3b or the pillar 3a.

Therefore, the arched frame 3b and the pillar 3a are hereinafter collectively referred to as a frame 3.

Figure 1A:
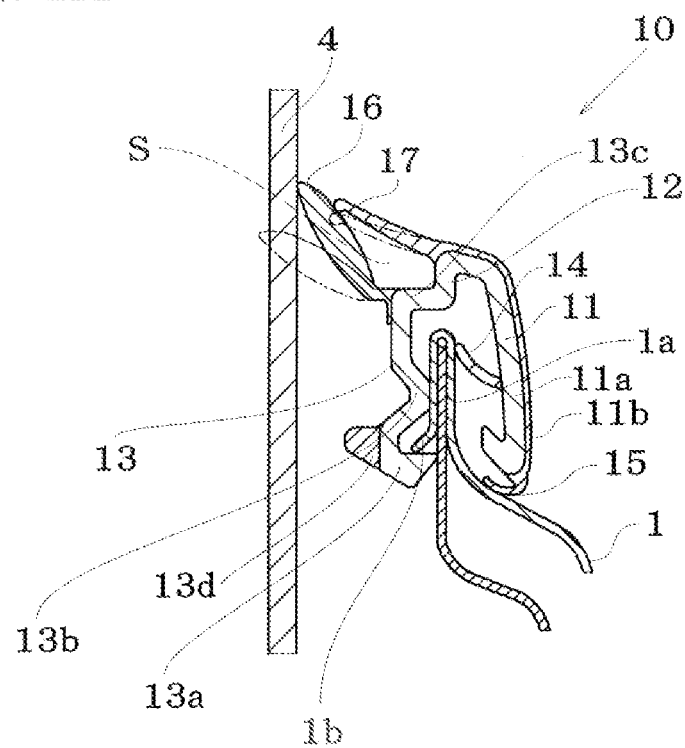
Figure 1B:
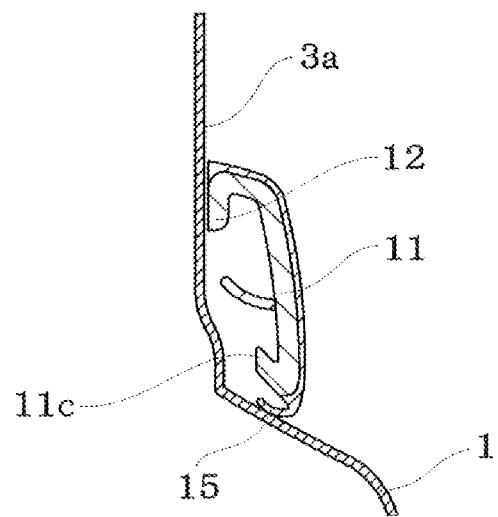

FIGS. 1A and 1B are cross-sectional views illustrating a first embodiment. FIG. 1A illustrates the cross-section of the beltline molding in the window raising and lowering area taken through line A-A in FIG. 5, and FIG. 1B illustrates the cross-section of the beltline molding situated on the frame 3 taken through line B-B in FIG. 5.

Figure 4:
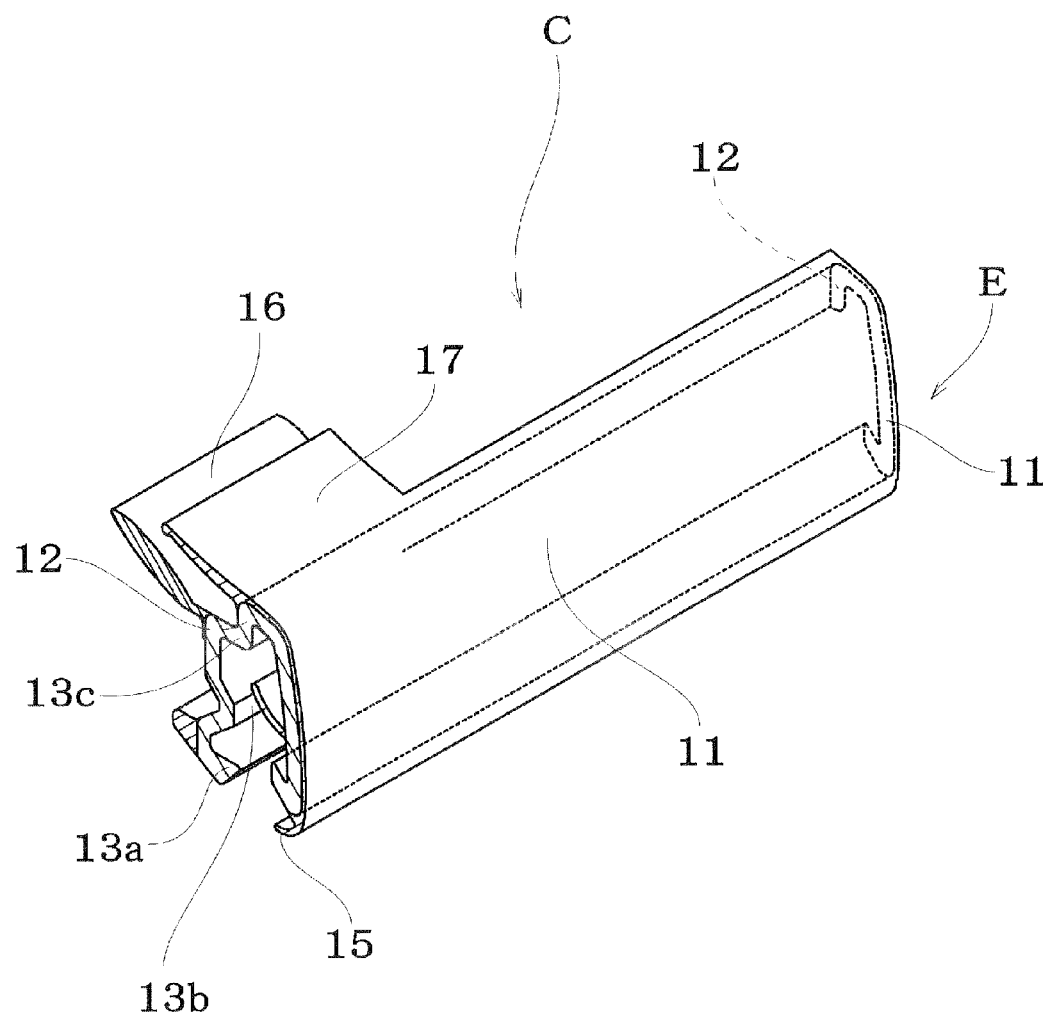
FIG. 4 is an external perspective view illustrating the end of a beltline molding that is cut at the cut line A-A in FIG. 5.

FIG. 4 illustrates the shape of the area near the end E of the beltline molding 10.

A seal lip 16, a sub-lip 17, and a clinch flange 13 are removed in the area C situated on the frame.

FIG. 1B illustrates the removed section of the area C illustrated in FIG. 4.

An end cap (not illustrated in FIG. 4) is fitted to the end E of the beltline molding 10.

The beltline molding 10 includes a vertical flange 12 that extends (almost vertically) downward from the upper part of a molding main body 11 that forms a design part, and the clinch flange 13 that extends downward from the lower part of the vertical flange 12 through a step 13c that extends inward.

The first embodiment is an example of a double lip structure in which the seal lip 16 and the sub-lip 17 are provided. The seal lip 16 is inclined relative to the window 4 and extends from the position on the inner side of the step 13c of the clinch flange 13 toward the window 4. The sub-lip 17 is provided so that the end thereof comes in contact with (presses) the outer side surface of the seal lip 16 and extends from the upper part of the vertical flange 12 toward the seal lip 16.

The window 4 is disposed between an outer panel 1 illustrated in FIG. 1A and an inner panel that is not illustrated in FIG. 1A so that the window 4 can be moved upward and downward.

The outer panel 1 has an outer panel upper edge 1a that is formed by turning the outer panel 1 inwardly toward the window raising and lowering area so that the step is formed between the outer panel upper edge 1a and the outer most surface of the outer panel 1.

A pressing section 14 that comes in elastic contact with the outer side of the outer panel upper edge 1a, and a pressing lip 15 that comes in elastic contact with the step of the outer panel 1 are provided on the back side of the molding main body 11.

Therefore, the beltline molding 10 can be fitted so that the molding main body 11 and the clinch flange 13 elastically hold either side of the outer panel upper edge 1a.

The seal lip 16 and the sub-lip 17 are formed of a flexible resin, an elastomer, or the like, and seal the gap between the beltline molding 10 and the window 4 while absorbing a variation in position of the window 4 in the interior-exterior direction. When a force is applied to the beltline molding 10 so that the beltline molding 10 rotates outward (rightward direction in FIG. 1A) around a contact section 13b (fulcrum), the outward rotation of the beltline molding 10 is prevented by a locking section 13a that engages an engagement section 1b. An inward rotation of the beltline molding 10 is prevented by the pressing section 14.

The pressing lip 15 seals the gap between the beltline molding 10 and the outer panel 1.

The molding main body 11, the vertical flange 12, and the clinch flange 13 are formed of a hard resin, and the pressing section 14 and the pressing lip 15 are formed of a flexible resin or an elastomer.

In the first embodiment, a core 11a of the molding main body 11 is formed of a hard resin, and a surface design part 11b, the sub-lip 17, and the pressing lip 15 are formed of a flexible resin.

In the first embodiment, since the seal lip 16 is provided upwardly from the step 13c, a recess is formed over the upper side of the step 13c, and dust or the like may accumulate in the recess. However, since the sub-lip 17 is provided to plug the recess, the recess is not observed from the outside, and excellent exterior design is achieved while preventing accumulation of dust or the like.

Since the space S inside the double lip structure is closed, the sound insulating properties of the molding are improved.

Moreover, variations in the position of the window 4 in the interior-exterior direction can be absorbed by the double lip structure, and a high seal capability (water removal capability) is achieved.

In the first embodiment, a situation in which the window 4 moves outward to a large extent is prevented by providing a soft section 13d at the lower part of the clinch flange 13.

FIG. 1B illustrates the cross-section of the beltline molding 10 situated on the pillar 3a, wherein the clinch flange 13, the seal lip 16, and the sub-lip 17 have been removed while allowing the rigid vertical flange 12 to remain.

The molding main body 11 and the vertical flange 12 form a cross-section approximately in the shape of the letter "C."

In the first embodiment, since the lower end 11c of the core 11a of the molding main body 11 has a cross-sectional shape that extends inwardly upward, the cross-sectional rigidity is further improved, and an end cap can inserted (fitted) into the end of the beltline molding 10.

Figure 2A:
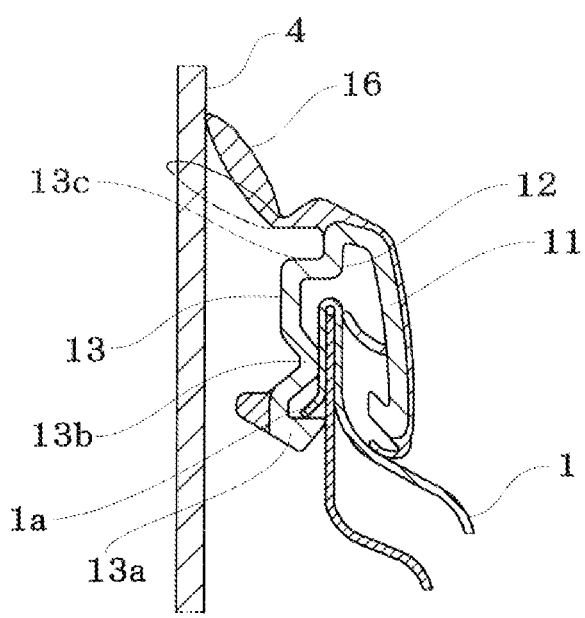

FIG. 2A illustrates a second embodiment in which the seal lip 16 extends upward from the upper part of the vertical flange 12 and the molding main body 11.

Figure 3A:
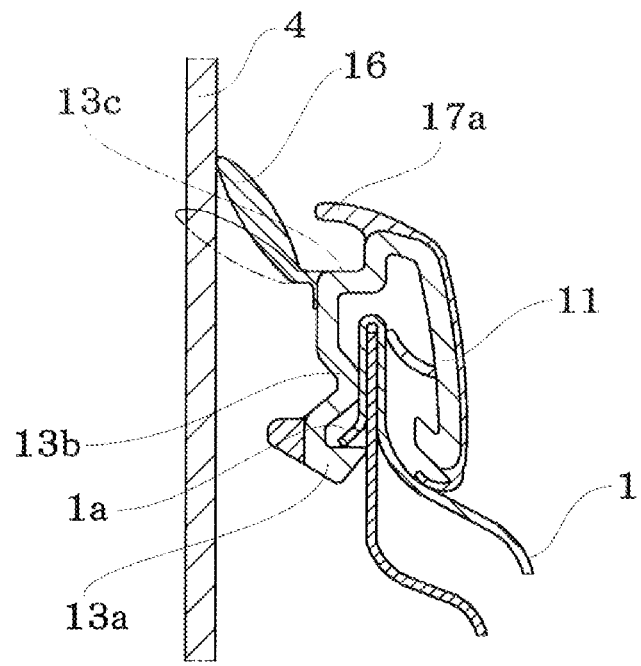

FIG. 3A illustrates a third embodiment in which the sub-lip 17a serves as a design lip, and does not come in contact with the seal lip 16.

Figure 2B:
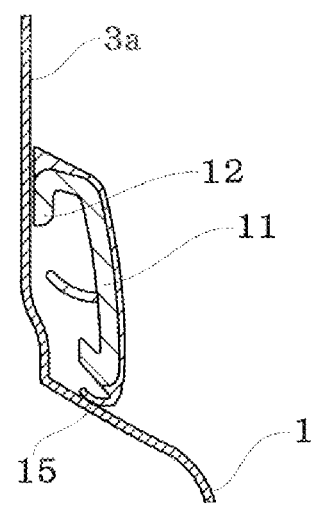
Figure 3B:
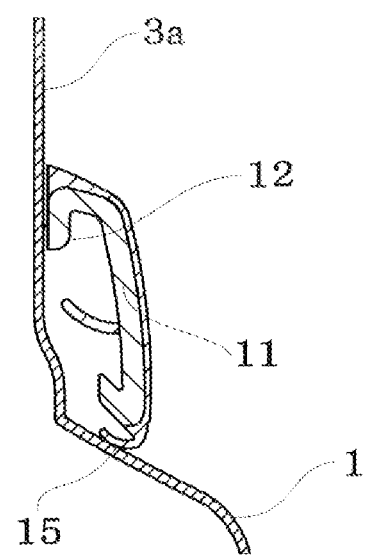

In the second embodiment (see FIG. 2B) and the third embodiment (see FIG. 3B), the vertical flange 12 and the molding main body 11 form a cross-section approximately in the shape of the letter "C" in the area situated on the pillar 3a.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A beltline molding that is fitted to a vehicle door, the beltline molding comprising:

a molding main body that extends from a window raising and lowering area to a surface of a door frame; and a cross-sectional view of the main molding body, taken in a direction perpendicular to a longitudinal extension direction of the main molding body, has a step shaped section that extends inwardly downward from an upper part of the molding main body, wherein the step shaped section includes a seal lip that comes in sliding contact with a window, a vertical flange that extends downward from the upper part of the molding main body, a step that extends inward from a lower part of the vertical flange substantially horizontally, and a clinch flange that extends downward from an end of the step, wherein the beltline molding is fitted to an upper edge of an outer panel of the vehicle door in the window raising and lowering area in a state in which the upper edge is held between the molding main body and the clinch flange, and wherein in an area situated on the surface of the door frame, the seal lip, the step and the clinch flange are removed while allowing the vertical flange to remain.

2. A beltline molding that is fitted to a vehicle door, the beltline molding comprising:

a molding main body that forms a design surface; and a cross-sectional view of the main molding body, taken in a direction perpendicular to a longitudinal extension direction of the main molding body, has a step shaped section that extends inwardly downward from an upper part of the molding main body, wherein the step shaped section includes a vertical flange that extends downward from the upper part of the molding main body, a step that extends inward from a lower part of the vertical flange substantially horizontally, and a clinch flange that extends downward from an end of the step, wherein the beltline molding is fitted to an upper edge of an outer panel of the vehicle door in a state in which the upper edge is held between the molding main body and the clinch flange, and wherein the step shaped section includes a seal lip that extends from the clinch flange so as to come in sliding contact with a window, and a sub-lip that extends from the vertical flange and comes in contact with an outer side of the seal lip.

* * * * *